United States Patent
Anetsberger et al.

(10) Patent No.: US 10,473,050 B2
(45) Date of Patent: Nov. 12, 2019

(54) PRESSURE ACCUMULATOR DEVICE FOR A MOTOR VEHICLE FUEL INJECTION SYSTEM, AND METHOD FOR OPERATING A PRESSURE ACCUMULATOR DEVICE OF SAID TYPE

(71) Applicant: Continental Automotive GmbH, Hannover (DE)

(72) Inventors: Daniel Anetsberger, Regensburg (DE); Tet Kong Brian Chia, Regensburg (DE); Walter Sassler, Regensburg (DE)

(73) Assignee: CPT Group GmbH, Hannover (DE)

( * ) Notice: Subject to any disclaimer, the term of this patent is extended or adjusted under 35 U.S.C. 154(b) by 61 days.

(21) Appl. No.: 15/302,933

(22) PCT Filed: Mar. 5, 2015

(86) PCT No.: PCT/EP2015/054667
§ 371 (c)(1),
(2) Date: Oct. 7, 2016

(87) PCT Pub. No.: WO2015/154923
PCT Pub. Date: Oct. 15, 2015

(65) Prior Publication Data
US 2017/0037805 A1    Feb. 9, 2017

(30) Foreign Application Priority Data

Apr. 8, 2014    (DE) .................. 10 2014 206 717

(51) Int. Cl.
*F02D 41/22*    (2006.01)
*F02D 41/38*    (2006.01)
(Continued)

(52) U.S. Cl.
CPC ....... *F02D 41/221* (2013.01); *F02D 41/3863* (2013.01); *F02M 63/025* (2013.01); *F16K 17/06* (2013.01); *F02D 2041/224* (2013.01)

(58) Field of Classification Search
CPC .... F02D 41/221; F02D 41/22; F02D 41/3863; F02D 41/3836; F02D 41/3809;
(Continued)

(56) References Cited

U.S. PATENT DOCUMENTS

| | | | | |
|---|---|---|---|---|
| 5,241,933 | A | * | 9/1993 | Morikawa ............... F02B 33/30 |
| | | | | 123/198 D |
| 6,442,934 | B1 | * | 9/2002 | Okuda .................. F04B 49/002 |
| | | | | 60/451 |

(Continued)

FOREIGN PATENT DOCUMENTS

| CN | 1654802 A | 8/2005 |
|---|---|---|
| CN | 101418762 A | 4/2009 |

(Continued)

OTHER PUBLICATIONS

International Search Report and Written Opinion dated Jun. 18, 2015 from corresponding International Patent Application No. PCT/EP2015/054667.

(Continued)

*Primary Examiner* — David Hamaoui

(57) ABSTRACT

An electrically driven solenoid coupled to a spring-operated valve, regulates pressure in an accumulator by opening when a predefined threshold pressure in a pressure accumulator is exceeded. The solenoid provides an assistive force to a spring-closed valve, reducing the amount of pressure required to open the valve responsive to the amount of current provided to the solenoid. The threshold pressure at which the valve opens is thus determined by the amount of current provided to the solenoid. Increasing the current (Continued)

decreases the threshold pressure; decreasing the current increases the threshold pressure.

7 Claims, 3 Drawing Sheets

(51) Int. Cl.
*F02M 63/02* (2006.01)
*F16K 17/06* (2006.01)

(58) Field of Classification Search
CPC ......... F02D 2041/224; F02D 2041/225; F16K 17/06; F02M 63/025; F02M 63/0052
See application file for complete search history.

(56) References Cited

U.S. PATENT DOCUMENTS

| | | | |
|---|---|---|---|
| 7,856,960 B2 | 12/2010 | Serra et al. | |
| 8,240,290 B2 * | 8/2012 | Miyake | F02D 41/3836 |
| | | | 123/198 D |
| 8,573,185 B2 * | 11/2013 | Miura | F02D 41/22 |
| | | | 123/198 D |
| 8,881,707 B2 * | 11/2014 | Katsurahara | F02D 41/221 |
| | | | 123/198 D |
| 9,057,347 B2 * | 6/2015 | Veit | F02M 47/027 |
| 9,140,205 B2 * | 9/2015 | Hermes | F02D 41/32 |
| 9,611,800 B2 * | 4/2017 | Veit | F02D 41/1401 |
| 2008/0257314 A1 * | 10/2008 | Veit | F02D 41/1401 |
| | | | 123/511 |

FOREIGN PATENT DOCUMENTS

| | | |
|---|---|---|
| DE | 19604552 A1 | 8/1997 |
| DE | 19714488 C1 | 9/1998 |
| DE | 19908352 A1 | 8/2000 |
| DE | 10003298 A1 | 8/2001 |
| EP | 1903210 A1 | 3/2008 |
| GB | 2328526 A | 2/1999 |
| JP | H11117797 | 4/1999 |
| JP | 2002371940 A | 12/2002 |
| WO | 2009/132721 A1 | 11/2009 |

OTHER PUBLICATIONS

German Office Action dated Dec. 12, 2014 for corresponding German application No. 10 2014 206 717.0.
Korean Office Action dated Aug. 31, 2017 for corresponding German application No. 10-2016-7031146.
Chinese Office Action dated May 28, 2018 for counterpart Chinese Patent Application No. 201580017948.0.
Korean Notice of Allowance dated Aug. 29, 2019 for corresponding Korean application No. 10-2016-7031146.
China Notice of Allowance dated Jul. 30, 2019 for corresponding China patent application 201580017948.0 0.
India First Examination Report dated Jul. 25, 2019 for corresponding India patent application 201617031859.

* cited by examiner

PRESSURE ACCUMULATOR DEVICE FOR A MOTOR VEHICLE FUEL INJECTION SYSTEM, AND METHOD FOR OPERATING A PRESSURE ACCUMULATOR DEVICE OF SAID TYPE

FIELD OF THE INVENTION

The invention is within the sector of mechanical and electrical engineering and, specifically, is concerned with monitoring a pressure regulating system for a pressure accumulator.

BACKGROUND

In the art, pressure accumulators for fluids are used in a large and wide range of applications, e.g. in drinking water and process water delivery, in pressurized lubrication and, in particular, in injection systems for fuel in connection with internal combustion engines, particularly in the motor vehicle sector.

In the area of common rail engine injection, pressure accumulators for fuel which are operated at pressures of between a few hundred and a few thousand bar are used, for example. Depending on requirements, correspondingly high pressures are provided and set in the pressure accumulator.

For supplying fluid, especially liquids, to such pressure accumulators, high-pressure pumps which can themselves be controlled may be considered, on the one hand, but, on the other hand, control of the setpoint pressure by controlling the quantity of fluid fed to the pump may be considered.

Normally, at least one pressure sensor is provided in the pressure accumulator, said sensor allowing detection of the actual pressure and transmission of this information to a pressure regulating system.

Moreover, in many cases not only the removal device for using the fluid but also a pressure reduction valve, which can discharge fluid at least in the event of failure of the pressure regulating system, is provided. However, a pressure reduction valve of this kind can also be controlled in such a way that, when the pressure level in the pressure accumulator is too high, the regulating system can resort to the pressure reduction valve and can achieve a pressure reduction by that means. For this purpose, pressure reduction valves of this kind are in many cases controllable.

In the event of a failure of the high pressure sensor in the pressure accumulator too, the high requirements of the reliability of a motor vehicle or of some other system incorporating a pressure accumulator mean that continued operation must be possible. For this purpose, a "feed forward" system is provided in the motor vehicle sector, said system delivering a certain fuel quantity to the pressure accumulator via the feed device independently of any feedback from a pressure sensor.

However, faults can occur not only in the pressure sensor but also in other components of the system which has the pressure accumulator, e.g. pumps, valves, seals and the housing wall of the pressure accumulator. It is therefore desirable to create ways of checking the pressure regulation in the case of a pressure accumulator of the type described.

SUMMARY

The object is achieved in respect of a method by means of the features of the invention as per patent claim 1. The dependent claims 2 to 8 present worthwhile advantageous embodiments of the invention. Patent claims 9 and 10 relate to a pressure accumulator device according to the invention.

Accordingly, the invention relates to a method for operating a pressure accumulator device for a motor vehicle fuel injection system, in which method a fluid is fed at high pressure to a pressure accumulator by means of a feed device, in which method fluid is removed from the pressure accumulator by means of at least one removal device, and in which method a controllable pressure reduction valve is used to remove fluid from the pressure accumulator with the aim of pressure control, wherein the pressure in the pressure accumulator is regulated to a setpoint pressure, wherein the pressure reduction valve opens automatically in the event of a predetermined threshold pressure in the pressure accumulator being exceeded, and wherein, to check the pressure regulation of the pressure accumulator, the threshold pressure of the pressure reduction valve is increased, and the change in the fluid pressure in the pressure accumulator with respect to time is then detected.

Particularly in the case of a pressure accumulator for a motor vehicle fuel injection system, regulation is normally performed in such a way that a setpoint pressure that varies with time is demanded according to the driving situation, in particular by an engine management unit, and that the pressure in the pressure accumulator is then regulated continuously to this setpoint pressure. There may be indications that pressure regulation in the pressure accumulator is not working properly, e.g. non-optimal functioning of the internal combustion engine or a pressure characteristic in the pressure accumulator which is not according to requirements.

Such a deviation from the setpoint behavior may have various causes, e.g. leaks at seals or in the pump region or non-optimal functioning of the pump as well as faults in valves or the like. However, it may also happen that the setpoint pressure demanded is above the operating range of the accumulator, making it not only not desirable but also dangerous and in all cases to be averted that such a pressure should be set.

Such an excess pressure is normally dissipated via the pressure reduction valve, although it is not normally apparent to the driver whether the pressure reduction valve is open or has been open. Among the reasons for this is that the pressure reduction valve normally switches very quickly and may also be open only for a very short time for pressure reduction. It is therefore not apparent to the driver whether the pressure reduction valve is/has been open for a relatively long or a relatively short time in the meantime.

According to the invention, the threshold pressure of the pressure reduction valve is now increased, advantageously temporarily.

If the pressure reduction valve has previously been closed, it remains closed in all cases when the threshold pressure is increased. The system deviation in the pressure regulating system of the pressure accumulator which has given rise to a checking operation will then continue to exist but it will be possible to ascertain that it is not due to the behavior of the pressure reduction valve and is not due to exceeding of the setpoint pressure.

If the pressure reduction valve has already been opened, this has ensured that it was not possible for the pressure in the pressure accumulator to increase beyond the set threshold value of the pressure reduction valve. If there is an increase in the threshold pressure of the pressure reduction valve, said valve is then closed. This results in a change in the pressure conditions in the pressure accumulator. Normally, i.e. when there are leaks or inefficient operation of the pump, the pressure in the pressure accumulator will not rise after the raising of the pressure threshold in the pressure reduction valve and a subsequent closure of the pressure reduction valve. It is thereby possible to narrow down the fault in the pressure regulation, namely to a pressure loss due to leakage or to inefficient operation of the high-pressure pump.

After this classification of the fault has taken place, the threshold pressure of the pressure reduction valve can be brought back to the original value.

The entire method can run in an automated fashion, with automatic detection of deviations from measured values, particularly for the pressure, in the pressure accumulator from setpoint values, automatic actuation of the pressure reduction valve and variation of the pressure threshold of the valve and subsequent detection of the pressure behavior.

Accordingly, an advantageous embodiment of the invention envisages that the actual pressure in the pressure accumulator is monitored and compared with a predetermined setpoint pressure, and that the difference between the actual pressure and the setpoint pressure is compared with a difference threshold value, that, if a differential threshold value is exceeded, the threshold pressure of the pressure reduction valve is increased and the characteristic of the pressure in the pressure accumulator with respect to time is detected.

The existing fault is advantageously classified by inferring the exceeding of the original threshold pressure in the pressure accumulator if the increase in the threshold pressure of the pressure reduction valve is followed by a pressure increase in the pressure accumulator. The classification furthermore envisages that a fault in the pressure regulation (pressure loss due to leakage or inefficient operation of the high-pressure pump) is inferred if the increase in the threshold pressure of the pressure reduction valve is not followed by a pressure increase in the pressure accumulator.

In respect of the control of the pressure reduction valve, the method according to the invention advantageously envisages that the pressure reduction valve is controlled by energizing a solenoid coil, in the field of which a solenoid armature is driven, said armature exerting on a closure element of the pressure reduction valve a force determined by the magnetic field, and that the force on the closure element and hence the threshold pressure for automatic opening of the pressure reduction valve can be controlled by means of the energization.

For example, the solenoid armature can be connected to a tappet which is secured directly on the closure element or is in contact therewith in order to exert tensile or compressive forces on the closure element. By way of example, the closure element is situated immediately in front of an opening of the valve, which connects the pressure chamber of the pressure accumulator to a low-pressure chamber, in particular a fluid reservoir at atmospheric pressure. Accordingly, the closure element is acted upon during operation by a differential pressure which corresponds to the difference between the pressures in the pressure accumulator and outside.

The current through the solenoid coil is usually regulated and produces a setpoint force on the solenoid armature. In this case, the solenoid armature can press on the closure element in the closing direction or, alternatively, in the opening direction as a result of being driven in the solenoid coil, depending on which threshold pressure is to be set for the automatic opening of the pressure reduction valve.

For this purpose, provision can advantageously be made for the force of a spring to act in the closing direction on the closure element of the pressure reduction valve and for a force to be exerted on the closure element in the opening direction by the solenoid armature when the solenoid coil is energized. In this case, the force which acts on the closure element through the solenoid armature is generally opposed to the spring force of the spring. As a result, it is particularly simple to compensate for tolerances in the pressure reduction valve and the spring through an appropriate choice of current through the solenoid coil.

In the method according to the invention, it is furthermore advantageously possible to provide for the solenoid coil to be continuously energized during the operation of the pressure accumulator and for the current to be switched off to check the pressure regulation in the pressure accumulator. By virtue of the fact that the solenoid coil is continuously energized, the closing force of the spring on the closure element of the pressure reduction valve is reduced during operation, thereby lowering the setpoint pressure in the pressure accumulator. If the current is switched off, the full pressure force of the spring acts on the closure element, with the result that the valve opens only at a higher fluid pressure and hence a higher fluid pressure can be established. If the pressure reduction valve was already open before the current was switched off, it is closed through the increase in the threshold pressure as the current is switched off, this being noticeable from a tendency for the pressure to increase in the pressure accumulator. If there is no increase in the pressure in the pressure accumulator after the current is switched off, this is an indication that the pressure reduction valve was not open and, accordingly, the pressure in the pressure accumulator had not exceeded the threshold pressure of the pressure reduction valve during normal operation. The valve then remained closed even after the current was switched off. Any faults which have been detected are then attributable to other elements of the pressure accumulator.

Another advantageous embodiment of the invention envisages that, to determine the current of the energization of the solenoid coil, the current required to overcome the spring force and the other mechanical resistances to the opening of the pressure reduction valve by the magnetic armature that can be driven in the solenoid coil is initially determined at atmospheric pressure, and that a current difference determined in accordance with the intended threshold pressure is subtracted from the current determined in this way.

By means of the method described, the amount of current that has to be employed to overcome the force of the spring and the mechanical resistance forces in the valve mechanism with the corresponding force acting on the solenoid armature can first of all be determined. A certain amount is then subtracted from the force determined in this way and is converted into a current with which the solenoid coil should be continuously energized. The current to be employed during operation can be determined from the desired threshold pressure by means of a reference table or a conversion formula, for example.

The invention relates not only to a method of the type described above but also to a pressure accumulator device of a motor vehicle fuel injection system having a feed device for feeding fluid at high pressure to the pressure accumulator, having a removal device for the selective removal of fluid at high pressure, having a regulating device for regulating the pressure in the pressure accumulator to a setpoint pressure, and having a controllable pressure reduction valve, which allows fluid to be discharged from the pressure accumulator independently of the removal device, wherein the pressure reduction valve opens automatically in the event of a predetermined threshold pressure being exceeded, and wherein the threshold pressure of the pressure reduction valve is controllable, in particular selectively variable.

To carry out the method according to the invention, there is a need for a pressure accumulator device having a controllable pressure reduction valve, with the result that the threshold pressure at which the pressure reduction valve automatically opens can be selectively varied. As a result, the threshold value can be raised to check the pressure regulation, whereby the pressure reduction valve predictably closes or is held closed. By means of subsequent detection of the development of the pressure in the pressure accumulator with respect to time, an existing fault can then be classified more specifically.

A particularly advantageous embodiment of the pressure accumulator device according to the invention consists in that the pressure reduction valve has a closure element pressed against a valve seat by means of spring force and has a solenoid armature, which can be driven by means of an energizable solenoid coil and acts in the opening direction on the closure element. By means of such a solenoid drive of the pressure reduction valve, a threshold value can be set or changed in a particularly simple and effectively reproducible manner.

BRIEF DESCRIPTION OF THE FIGURES

The invention is shown by means of an illustrative embodiment in figures of a drawing and explained below. In the drawings.

DETAILED DESCRIPTION

Figure 1:
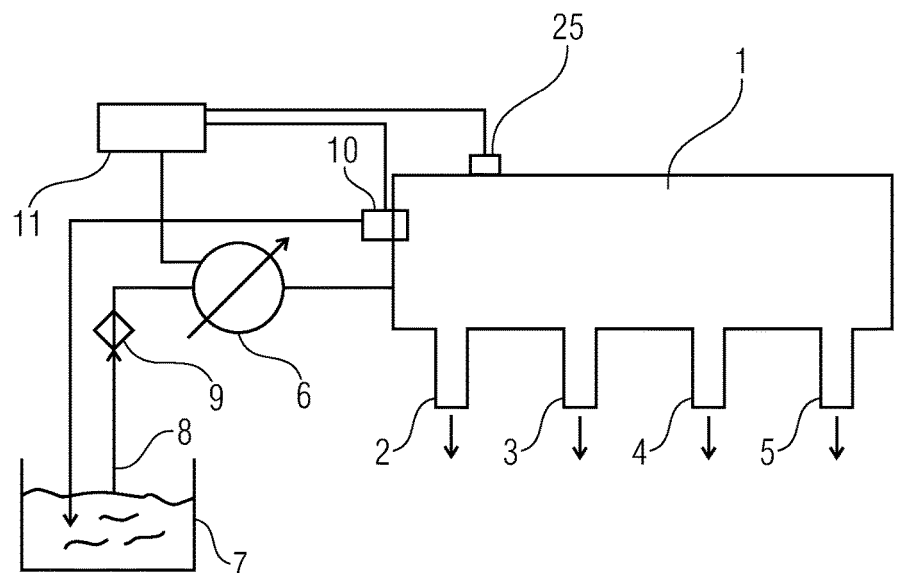
FIG. 1 shows a schematic illustration of a pressure accumulator device.

FIG. 1 shows a high-pressure injection system for a four-cylinder internal combustion engine, which is not shown specifically. The injection system has a pressure accumulator 1, which is connected to four injectors 2, 3, 4, 5. The individual injectors 2, 3, 4, 5 each have injection valves, which are indicated only schematically in FIG. 1.

The pressure accumulator 1 is fed with a fuel from a fuel reservoir 7 by means of a high-pressure pump 6 at a high pressure in the region of several hundred bar to a few thousand bar. The fuel is fed to the high-pressure pump 6 via a fuel line 8 and a filter 9. Regulation of the hydraulic pressure in the high-pressure reservoir 1 takes place in a manner not shown specifically in greater detail by regulating the fuel quantity fed to the high-pressure pump on the low-pressure side.

In order to allow better regulation of the pressure in the pressure accumulator, especially in situations of a falling fuel demand, a pressure reduction valve 10 which connects the pressure accumulator 1 to the low-pressure system, in particular the fuel reservoir 7, is provided. When the pressure reduction valve is open, the pressure in the pressure accumulator 1 can thus be reduced efficiently and quickly.

The pressure reduction valve 10 and an element which controls the fuel supply to the high-pressure pump 6 are advantageously connected, together with a pressure sensor 25 linked to the interior of the pressure accumulator 1, to a common regulating device 11.

Figure 2:
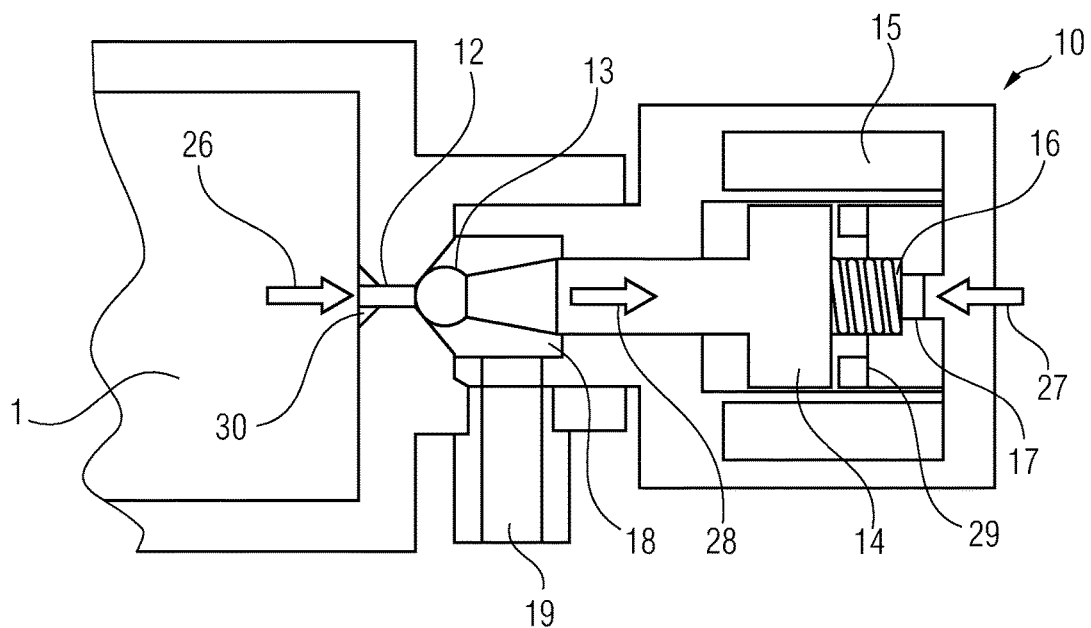
FIG. 2 shows a schematic illustration of a pressure reduction valve.

FIG. 2 shows the construction of the pressure reduction valve 10 schematically and by way of example. In this case, the pressure accumulator is shown on the left-hand side with the reference sign 1 and is connected to an opening 12 of the pressure reduction valve 10. The opening 12 can be closed by means of a closure element 13. The closure element 13 is connected to a solenoid armature 14 of a solenoid drive, wherein the solenoid armature 14 interacts as part of the solenoid drive with a solenoid coil 15 surrounding it. In the state of rest, i.e. when the solenoid coil 15 is not being supplied with a current, the solenoid armature 14 and, with the latter, the closure element 13 is pressed against the valve seat on the opening 12 by means of a spring 16, which is guided in a spring guide 17, and by means of the correspondingly acting spring force 27, and the pressure reduction valve is thus closed against the hydraulic pressure 26 in the pressure accumulator 1. Thus, no fuel can emerge from the pressure accumulator 1.

If the solenoid coil 15 is supplied with a sufficiently strong electric signal, with the result that a high current flows, the armature 14 is pulled into the coil 15, and the closure element 13 is thus moved away from the opening 12 against the force of the spring 16. Fuel can then be discharged from the pressure accumulator 1 through the opening 12 into the valve chamber 18 and, from there, via the outflow line 19, into the fuel reservoir 7. It is advantageous if the pressure reduction valve 10 is designed in such a way that it can be operated as a "digital valve". This means that the valve is operated essentially only in an open position and in a closed position, wherein the opening 12 can be closed and opened very quickly by the movement of the closure element 13.

The fact that the forces acting on the armature 14 from the solenoid drive counteract the spring force 27 can be exploited in order to set the current for the operation of the solenoid drive for continuous operation in such a way that both individual instances of scatter in the spring constants and other production and assembly tolerances are compensated. For this purpose, the pressure reduction valve can first of all be calibrated under atmospheric conditions, i.e. when the pressure accumulator and also the fluid reservoir 7 are under atmospheric pressure, or when both sides of the pressure reduction valve are under the same pressure other than atmospheric pressure. For this purpose, the current is experimentally set in such a way that the magnetic force on the closure element 13 just overcomes the spring force 27.

A certain amount of current is then subtracted from the current thus determined through the solenoid coil, with the result that the pressure reduction valve is initially held closed with a reduced force. The subtracted amount of current is chosen so that the pressure reduction valve opens only when a certain hydraulic force 26, which corresponds to a threshold pressure of the valve, is added by the hydraulic force in the pressure accumulator 1 to the force of the solenoid drive.

The aim of this setting is to enable the pressure reduction valve to open automatically, e.g. at a threshold pressure of 2200 bar in the pressure accumulator 1, if the threshold pressure is 3000 bar without energization of the solenoid coil for instance.

The amount of current which has to be subtracted from the initially determined current at which the magnetic force and the spring force balance out in the valve can be found in a reference table stored in a regulating device 11, for example. However, the amount of current can also be determined by means of an advantageously linear characteristic depending on the desired triggering/threshold pressure of the valve.

Figure 3:
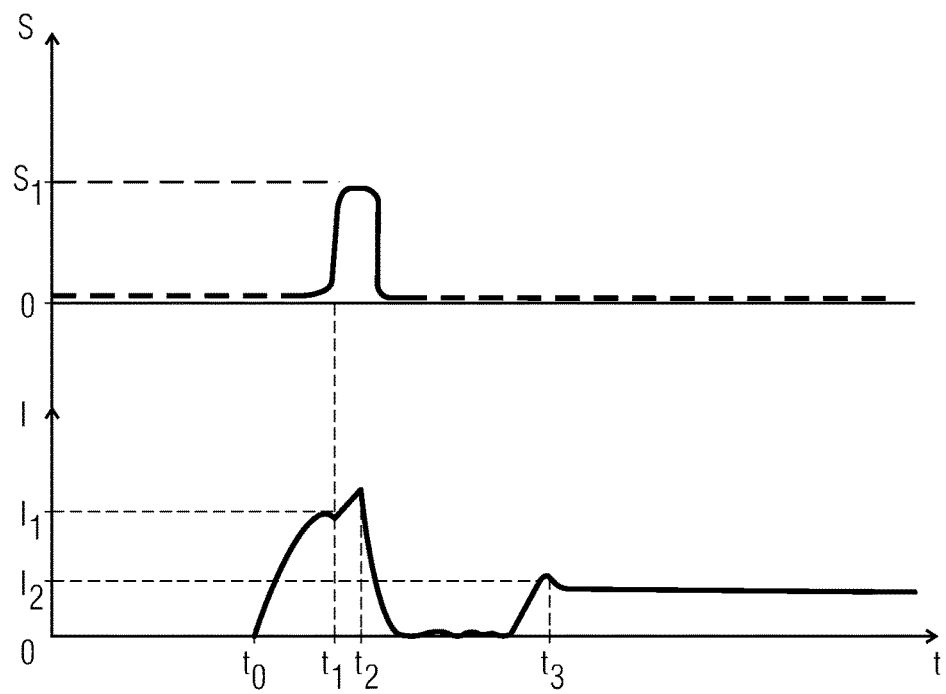
FIG. 3 shows a diagram which shows the setting of the balance current for compensating the spring force of the pressure reduction valve.

For better operation of the pressure reduction valve 10, a restriction 30 is provided in the region of the opening 12 of the valve on the side of the high-pressure accumulator 1. The flow resistance through the restriction 30 is significantly greater than the flow resistance of the opened pressure reduction valve 10. The effect of opening and closing processes of the pressure reduction valve is thereby reduced, and therefore the pressure reduction valve approaches the ideal form of the digital valve. FIG. 3 shows the process of setting the pressure reduction valve schematically in a diagram.

In the lower part of the diagram, the time t is plotted on the horizontal axis, and the current in the solenoid coil 15 is plotted on the vertical axis. The current is increased over the time from $t_0$ up to the current $I_1$, which is achieved at time $t_1$. The current $I_1$ refers to the current at which the spring force of the compression spring and additional mechanical resistances are balanced out by the magnetic driving force of the solenoid armature and the solenoid coil in the pressure reduction valve when both sides are under atmospheric pressure, and the valve opens. This current $I_1$ is first of all recorded. After this, the current can be increased further, wherein the valve remains open. At time $t_2$, it is assumed that the pressure accumulator 1 is put under high pressure. During operation, the pressure reduction valve is now closed again, and then the current is set to the value $I_2$, which is obtained from the determined current $I_1$ by subtracting a certain amount of current, which depends on the desired threshold pressure of the valve. At this current $I_2$, the valve can then be operated continuously.

In the upper part of the diagram in FIG. 3, the time t is plotted on the horizontal axis at the same scale as in the lower part, while the opening path s of the closure element 13 of the pressure reduction valve is shown there on the vertical axis. It can be seen that, initially, at time t=0, the valve is closed and is held closed by the spring force. While the current in the solenoid drive is increased over time, the magnetic force grows until it balances out the spring force at time $t_1$ and opens the valve, this being shown in the upper part of the diagram in FIG. 3 by the path $s_1$ traveled by the valve tappet/closure element 13. The valve closes when, at time $t_2$, the current is lowered from the current above $I_1$ to 0. The pressure reduction valve remains closed for as long as the pressure prevailing in the pressure accumulator is below the desired threshold pressure. If the current $I_2$ continues to be applied in the solenoid drive of the valve, the closure element 13 closes the opening 12 by means of the force of the spring 17 until the pressure in the pressure accumulator 1 rises above the threshold value again.

Figure 4:
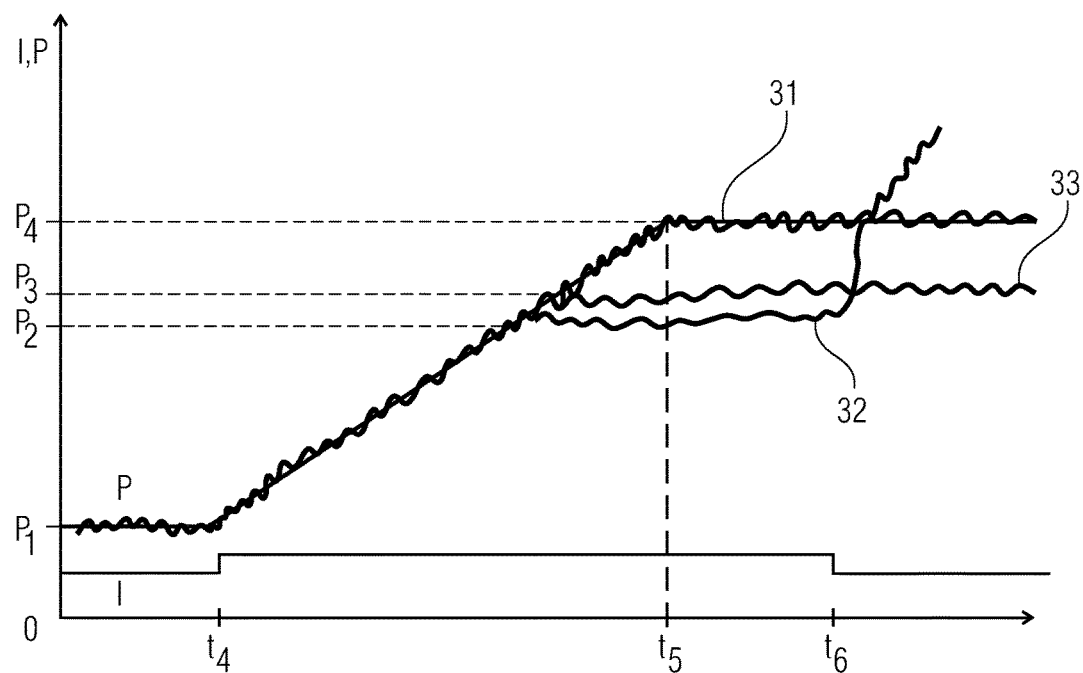
FIG. 4 shows a diagram which illustrates the pressure characteristic in the pressure accumulator depending on various fault events.

In FIG. 4, the time characteristic is plotted on the horizontal axis, while currents, on the one hand, and pressure characteristics, on the other hand, are plotted on the vertical axis. First of all, a pressure characteristic in the pressure accumulator is illustrated in the setpoint pressure curve 31, which begins with a first pressure $p_1$ and a horizontal pressure characteristic. In this phase, the pressure $p_1$ prevails in the pressure accumulator 1, and the pressure reduction valve 10 is not energized. From time $t_4$ onward, the pressure reduction valve 10 is, on the one hand, energized with the setpoint current, which sets the desired threshold pressure of, for example, 2200 bar at the pressure reduction valve. The pressure demand on the pressure accumulator rises in the course of time, and the pressure is increased there, this being shown by the linear rise in the pressure up to time $t_5$. Normally, a horizontal pressure characteristic, i.e. the maintenance of a constant pressure in the pressure accumulator, is ensured as soon as the setpoint pressure has been set, which can correspond at the maximum to the threshold pressure of the pressure reduction valve, wherein this pressure is at $p_4$ in the example shown in FIG. 4.

In the absence of faults, this pressure is ensured by the regulation of the high-pressure pump 6, and therefore the pressure reduction valve 10 does not intervene and can remain closed.

If there is a fault in the system, the desired pressure $p_4$ is often not reached. It can be seen from the example curves 32 (first fault curve) and 33 (second fault curve) that the pressure in the pressure accumulator reaches a lower value than envisaged, namely pressure level $p_3$ or $p_2$. However, it is often difficult to identify the reason for the faulty behavior of the pressure regulating system. By means of the method according to the invention, a greater insight as to the cause of the fault can be obtained by switching off the current to the pressure reduction valve. If there is subsequently a pressure rise when the current is switched off at time $t_6$, for example, as illustrated by means of the first fault curve 32, this indicates that the pressure reduction valve was closed by switching off the current and that consequently it was open before the current was switched off. This indicates that the pressure in the pressure accumulator 1 was too high and was automatically reduced by the pressure reduction valve. This observation suggests that the pressure regulation is faulty and that the system is under an excess system pressure.

If the pressure characteristic in accordance with the second fault curve 33 is obtained after switching off the pressure reduction valve, it is evident that the valve position has not been changed by switching off the current to the pressure reduction valve. Since the threshold pressure is raised by switching off the current, this allows the conclusion that the applicable threshold pressure had not been reached even before the current was switched off and the valve was thus closed. The pressure level $p_3$ established in accordance with the second fault curve 33 then has nothing to do with an excess pressure in the system but is very probably attributable to leaks and/or inefficient operation of the high-pressure pump. It is thus possible, by means of the method according to the invention, to perform fault discrimination in the pressure regulating system of the pressure accumulator by switching off the current to the pressure reduction valve.

Figure 5:
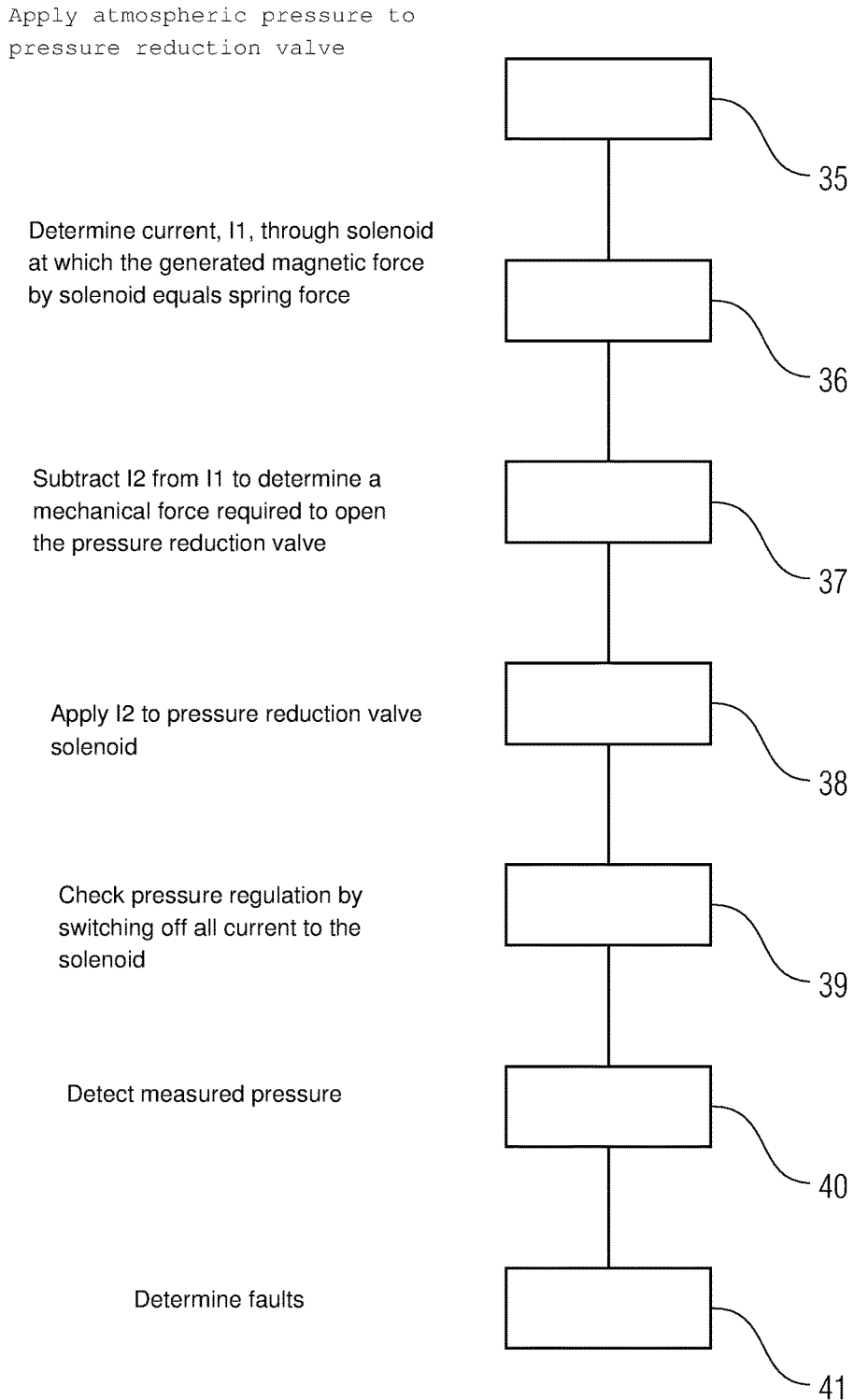
FIG. 5 shows a schematic illustration of the method sequence according to the invention.

The method described for operating the pressure accumulator with a controllable pressure reduction valve will once again be briefly outlined with reference to FIG. 5. In a first method step 35, the pressure reduction valve 10 on the pressure accumulator 1 is operated, wherein the pressure accumulator 1 is under atmospheric pressure, as is the fluid reservoir 7. In a second method step 36, a current which just leads to the opening of the valve and which thus cancels out the spring force of the valve and compensates for all tolerances and the additional forces caused thereby is then set at the pressure reduction valve.

In a third step 37, an amount of current which is subtracted from the current required to compensate the mechanical tolerances and the spring force is determined from the current level determined in the second step 36 and from the desired threshold pressure of the pressure reduction valve. In a fourth step 38, the current determined in the third step 37 for continuous energization of the pressure reduction valve 10 is set during the operation of the pressure accumulator.

If the need arises to check the pressure regulation in the system, either in the context of a regular periodic check or the suspicion of a malfunction arises due to a certain deviant behavior or a sensor indication, the current to the pressure reduction valve 10 is switched off in the fifth step 39 and, in the sixth step 40, the development of the measured pressure is detected. In the seventh step 41, fault discrimination and fault determination are carried out on the basis of the analysis of the pressure behavior.

The invention claimed is:

1. A method for operating a pressure accumulator device for a motor vehicle fuel injection system, the method comprising:
    applying fuel at a high pressure, to a pressure accumulator, by a fuel pump;
    removing pressure from the accumulator by a controllable, pressure reduction valve, the controllable pressure reduction valve comprising a solenoid-operated valve, configured to open responsive to an applied pressure, the applied pressure at which the solenoid-operated valve opens being determined by an amount of current provided to a solenoid coil of the solenoid-operated valve;
    automatically opening the pressure reduction valve in the event of a predetermined threshold pressure in the pressure accumulator being exceeded;
    checking pressure regulation of the pressure accumulator, comprising increasing the threshold pressure of the pressure reduction valve, determining whether fluid pressure in the pressure accumulator changes following increasing the threshold pressure of the pressure reduction valve, and determining whether a fault exists in the pressure regulation of the pressure accumulator based upon determining whether the fluid pressure in the pressure accumulator changes, wherein determining whether a fault exists determines a fault selected from the group comprising the pressure accumulator exceeding the predetermined threshold pressure thereof, and at least one of a leak and inefficient operation of the fuel pump existing; and
    prior to checking the pressure regulation of the pressure accumulator, monitoring the fluid pressure in the pressure accumulator; comparing the monitored pressure with a predetermined setpoint pressure; and comparing a difference between the fluid pressure and the setpoint pressure with a difference threshold value, wherein the checking of the pressure regulation of the pressure accumulator is performed responsive to the differential threshold value being exceeded.

2. The method of claim 1, wherein determining whether a fault exists comprises inferring pressure in the accumulator exceeding the predetermined threshold pressure in the pressure accumulator if the fluid pressure in the pressure accumulator increases following the increase in the threshold pressure of the pressure reduction valve.

3. The method of claim 1, wherein determining whether a fault exists comprises determining the at least one of a leak and inefficient operation of the fuel pump exists if the increase in the threshold pressure of the pressure reduction valve is not followed by a pressure increase in the fluid pressure in the accumulator.

4. The method of claim 3, wherein the pressure reduction valve is controlled by energizing the solenoid coil to generate a magnetic field that exerts magnetic force on an armature of the solenoid, said armature exerting force on a closure element of the pressure reduction valve, a magnitude of the force exerted on the closure element being determined by the magnetic field whereby the threshold pressure for automatic opening of the pressure reduction valve is controlled by controlling current flowing though the solenoid coil.

5. The method of claim 4, wherein the solenoid coil is energized during the operation of the pressure accumulator, and increasing the threshold pressure of the pressure reduction valve comprises switching off the current in the solenoid coil.

6. The method of claim 5, wherein a mechanical force of a spring acts to bias the closure element to a closed position and force is exerted on the closure element in the opening direction by the solenoid armature when the solenoid coil is energized.

7. The method of claim 6, further comprising initially determining an amount of current of the solenoid coil required to overcome a spring force from the spring and other mechanical resistance to opening the pressure reduction valve at atmospheric pressure, and following initially determining an amount of the current, determining a current difference in accordance with an intended threshold pressure and subtracting the current difference from the amount of current, a result of the subtracting being a current for energizing the solenoid coil during operation of the pressure accumulator.

* * * * *